US010030785B2

(12) United States Patent
Jung et al.

(10) Patent No.: US 10,030,785 B2
(45) Date of Patent: Jul. 24, 2018

(54) VALVE FOR FUEL CELL

(71) Applicant: Hyundai Motor Company, Seoul (KR)

(72) Inventors: Se Kwon Jung, Seoul (KR); Hyo Sub Shim, Gyeonggi-Do (KR); Bu Kil Kwon, Gyeonggi-oo (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 15/203,368

(22) Filed: Jul. 6, 2016

(65) Prior Publication Data

US 2017/0179509 A1   Jun. 22, 2017

(30) Foreign Application Priority Data

Dec. 17, 2015   (KR) ........................ 10-2015-0181070

(51) Int. Cl.
*F16K 31/06* (2006.01)
*H01M 8/04119* (2016.01)
*H01M 8/04082* (2016.01)
*H01M 8/04291* (2016.01)

(52) U.S. Cl.
CPC ...... *F16K 31/0693* (2013.01); *F16K 31/0672* (2013.01); *H01M 8/04126* (2013.01); *H01M 8/04156* (2013.01); *H01M 8/04201* (2013.01); *H01M 8/04291* (2013.01); *H01M 2250/20* (2013.01); *Y02T 90/32* (2013.01)

(58) Field of Classification Search
CPC .................. F16K 31/0693; F16K 31/0672
USPC ............... 251/129.07, 129.17, 175
See application file for complete search history.

(56) References Cited

U.S. PATENT DOCUMENTS

| 4,641,686 | A |   | 2/1987 | Thompson |   |
|---|---|---|---|---|---|
| 5,758,862 | A | * | 6/1998 | Sturman | ............... F04B 43/067 |
|   |   |   |   |   | 251/25 |
| 6,082,705 | A | * | 7/2000 | Arvidsson | ............. A61M 16/20 |
|   |   |   |   |   | 251/129.07 |
| 8,931,504 | B2 | * | 1/2015 | Canjuga | .................. F16K 1/126 |
|   |   |   |   |   | 137/220 |
| 2012/0061595 | A1 | * | 3/2012 | Canjuga | .................. F16K 1/126 |
|   |   |   |   |   | 251/62 |

FOREIGN PATENT DOCUMENTS

| JP | 2895073 B2 | 5/1999 |
| JP | 2014-066340 | 4/2014 |
| KR | 10-2011-0086350 | 7/2011 |
| KR | 10-2012-0045896 | 5/2012 |
| KR | 10-2015-0097921 A | 8/2015 |
| KR | 10-2015-0110201 | 10/2015 |

* cited by examiner

*Primary Examiner* — Eric Keasel
(74) *Attorney, Agent, or Firm* — Mintz Levin Cohn Ferris Glovsky and Popeo, P.C.; Peter F. Corless

(57) ABSTRACT

A valve for a fuel cell serves to discharge a fluid in a fuel cell system to the outside or other locations of the fuel cell system. The valve is mounted with a pressure transmission unit which is connected between a valve flow path unit having an inner flow path for moving a fluid and a solenoid unit for generating power for opening and closing the inner flow path of the valve flow path unit, and transmits pressure between the valve flow path unit and the solenoid unit, so as to minimize an operating load of the solenoid unit by minimizing a pressure difference between the valve flow path unit and the solenoid unit, regardless of factors such as working pressure and a temperature in the fuel cell system.

9 Claims, 5 Drawing Sheets

VALVE FOR FUEL CELL

CROSS-REFERENCE TO RELATED APPLICATION

This application claims under 35 U.S.C. § 119(a) the benefit of Korean Patent Application No. 10-2015-0181070 filed on Dec. 17, 2015, the entire contents of which are incorporated herein by reference.

BACKGROUND (a) Technical Field

The present invention relates to a valve for a fuel cell, more particularly, to a valve for a fuel cell that serves to discharge a fluid in a fuel cell system to the outside or other locations of the fuel cell system.

(b) Description of the Related Art

In general, a fuel cell system is a system that generates electrical energy while producing water by being supplied with oxygen from air and hydrogen used as fuel.

A fuel cell vehicle, which is provided with the fuel cell system, obtains driving power by using a method of operating a motor by using electricity generated by a reaction between hydrogen and oxygen in a fuel cell stack, and discharging water, which is produced when electricity is generated, to the outside.

To this end, it is necessary to maintain appropriate pressure and concentration of hydrogen and oxygen in the fuel cell stack, and to discharge the produced water so that the water does not block flow paths in the fuel cell stack.

In general, to maintain appropriate concentration of hydrogen and oxygen in the fuel cell stack, a method of discharging gas circulating in the fuel cell stack to the outside and introducing new hydrogen and air has been adopted, and a discharge valve for discharging gas serves this function. In addition, a water discharge valve serves to discharge water, which is discharged from the interior of the fuel cell stack, to the outside or other locations of the fuel cell system.

Because working pressure of the fuel cell system relatively higher than atmospheric pressure, the discharge valve and the water discharge valve must be designed to be able to withstand pressure to be applied to the fuel cell stack. For this reason, as working pressure of the fuel cell system is increased, operating pressure of the discharge valve must be increased, and a stronger spring and a stronger solenoid coil must be applied to the discharge valve so as to satisfy an operating pressure condition. Accordingly, there is a problem in that a volume and a weight of the discharge valve and electric current consumption are increased.

The above information disclosed in this Background section is only for enhancement of understanding of the background of the invention and therefore it may contain information that does not form the prior art that is already known in this country to a person of ordinary skill in the art.

SUMMARY

The present invention provides a valve for a fuel cell, which is mounted with a pressure transmission unit which is connected between a valve flow path unit having an inner flow path for moving a fluid and a solenoid unit for generating power for opening and closing the inner flow path of the valve flow path unit, and transmits pressure between the valve flow path unit and the solenoid unit, thereby minimizing an operating load of the solenoid unit by minimizing a pressure difference between the valve flow path unit and the solenoid unit, regardless of factors such as working pressure and a temperature in the fuel cell system.

In one aspect, the present invention provides a valve for a fuel cell, including: a valve flow path unit which has an inlet port for an inflow of a fluid, and a discharge port for discharging the fluid; a solenoid unit which is installed on an upper portion of the valve flow path unit and generates power for opening and closing the discharge port; a valve opening and closing unit which is installed to isolate a portion between the solenoid unit and the valve flow path unit in an airtight manner, and opens and closes the discharge port by using power from the solenoid unit; and a pressure transmission unit which is disposed outside the valve flow path unit and the solenoid unit, and transmits pressure between the valve flow path unit and the solenoid unit.

In a preferred embodiment, the pressure transmission unit may include a first chamber unit which is connected to be in fluid communication with the valve flow path unit, a second chamber unit which is connected to be in fluid communication with the solenoid unit, and a chamber diaphragm which is installed to isolate a portion between the first chamber unit and the second chamber unit in an airtight manner, and the chamber diaphragm may transmit pressure by being elastically deformed by a pressure difference between the first chamber unit and the second chamber unit.

In another preferred embodiment, a first hermetic pressure transmission chamber, which is connected to be in fluid communication with a branch flow path that branches off from the discharge port of the valve flow path unit, may be formed in the first chamber unit, a first chamber opening, which is in communication with the branch flow path, may be disposed at a lower end of the first pressure transmission chamber, a second hermetic pressure transmission chamber, which is connected to be in fluid communication with a fluid entrance for discharging air in the solenoid unit, may be formed in the second chamber unit, and a second chamber opening, which is in communication with the fluid entrance, may be disposed at an upper end of the second pressure transmission chamber.

In still another preferred embodiment, the chamber diaphragm may be made of a material that blocks the fluid from being transmitted to the second chamber unit while passing through the first chamber unit.

According to the valve for a fuel cell according to the present invention, since the pressure transmission unit, which transmits pressure between the solenoid unit and the valve flow path unit, is applied between the solenoid unit and the valve flow path unit, it is possible to minimize a pressure difference between the valve flow path unit and the solenoid unit regardless of factors such as working pressure and a temperature in the fuel cell system, and as a result, it is possible to minimize a load of an embedded spring to maintain a closed state of the discharge port of the valve flow path unit (in the case of a normal close valve) or an opened state of the discharge port of the valve flow path unit (in the case of a normal open valve). As a result, it is possible to reduce an operating load of the solenoid unit for operating the valve, and consequently, it is possible to improve package performance and minimize electric power consumption by reducing a volume of the solenoid unit.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
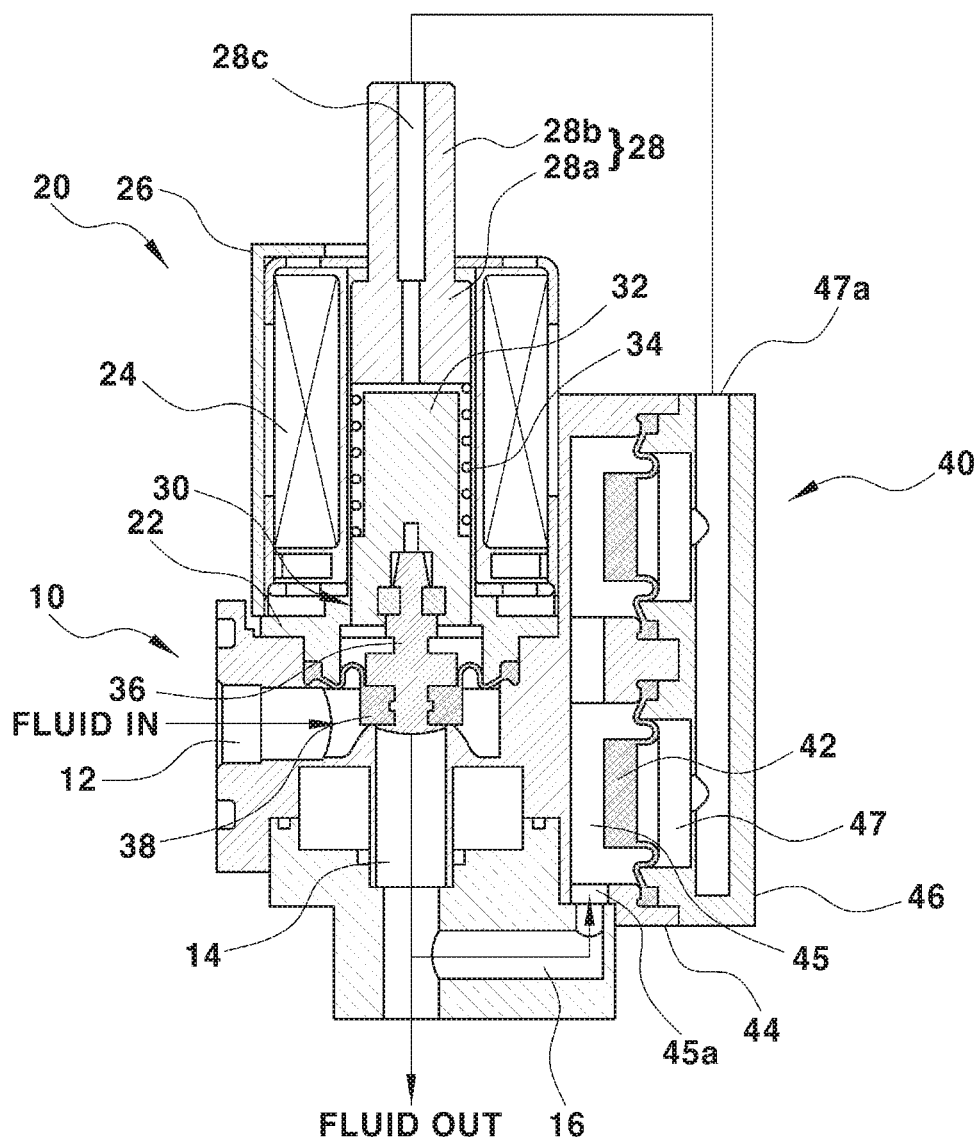
FIG. 1 is a configuration diagram illustrating a valve for a fuel cell according an exemplary embodiment of the present invention.
Figure 2:
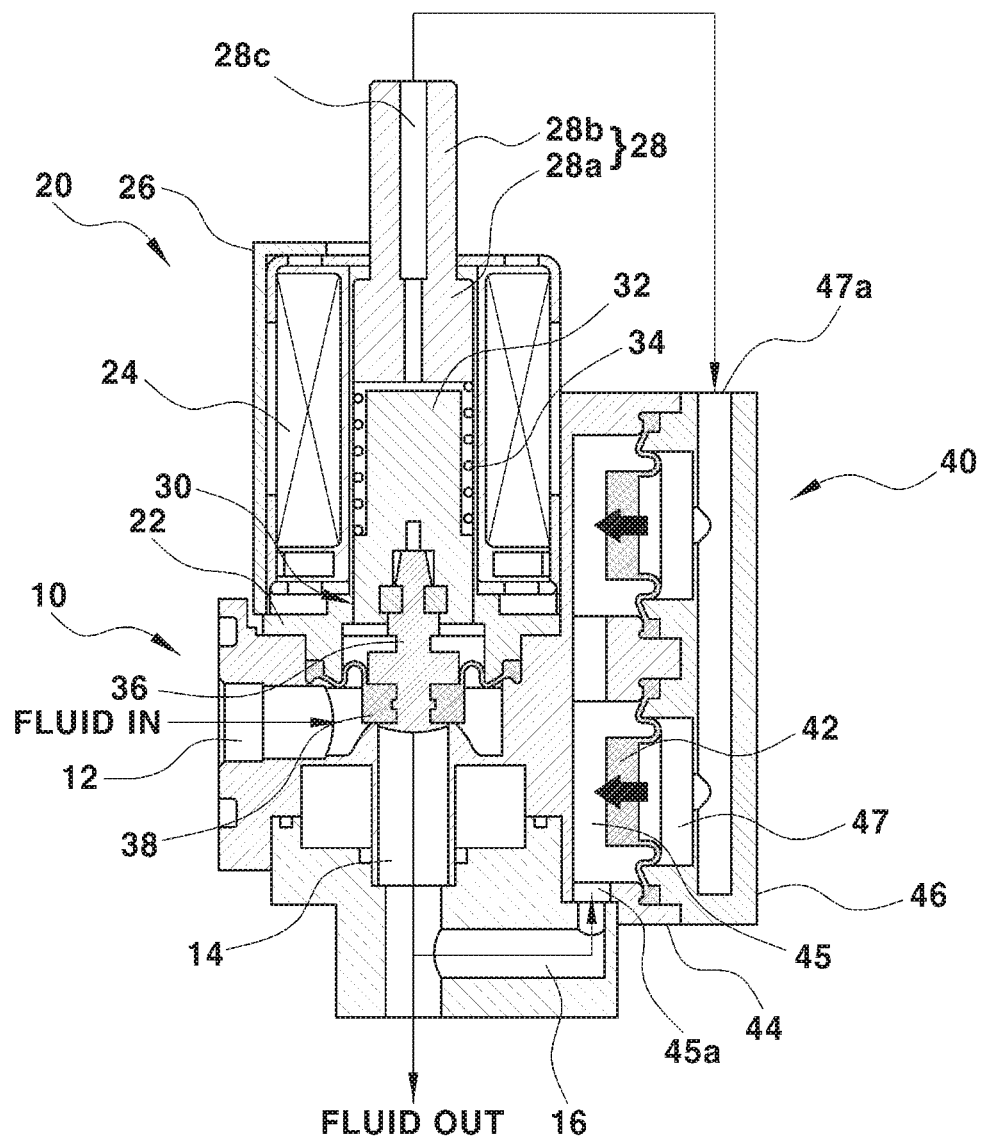
FIGS. 2 and 3 are views for explaining an operational state of a pressure transmission unit according to the exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in e accompanying drawings and described below. While the invention will be described in conjunction with exemplary embodiments, it will be understood that present description is not ended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Referring to FIG. 1, a valve for a fuel cell according to an exemplary embodiment of the present invention includes a valve flow path unit 10 which has an inner flow path through which a fluid flows in and out, a solenoid unit 20 which generates power for opening and closing the flow path, and a valve opening and closing unit 30 which is operated by power to open and close the flow path. A pressure transmission unit 40 for transmitting pressure is connectedly mounted between the valve flow path unit 10 and the solenoid unit 20.

The valve flow path unit 10 is provided with an inlet port 12 into which the fluid flows, and a discharge port 14 through which the fluid is discharged. The inlet port 12 and the discharge port 14 are connected to each other so as to define the inner flow path of the valve flow path unit 10, and the fluid such as gas or condensate water, which is discharged from a stack, may flow into the inlet port 12.

The solenoid unit 20 generates power for opening and closing the flow path or the discharge port of the valve flow path unit 10 by using electromagnetic force generated when electric power is applied from the outside, and the solenoid unit 20 is configured to be connected to the valve flow path unit 10 in a state in which the solenoid unit 20 is stacked on an upper portion of the valve flow path unit 10.

The solenoid unit 20 is provided with a housing 26 which accommodates a coil 24 disposed at an outer diameter side of a sleeve 22 coupled to the upper portion of the valve flow path unit 10 in a state in which the sleeve 22 is disposed at a center of the housing 26, and a core 28, which is installed inside the sleeve 22, is fixed by penetrating an upper portion of the housing 26, and electromagnetic force is generated by electric power applied to the coil 24.

In particular, the core 28 includes a body portion 28a which is positioned in the sleeve, and a stem portion 28b which is formed to be movable integrally with the body portion 28a and penetrates the upper portion of the housing 26.

Screw threads (not shown) preferably are formed on an outer circumference of the stem portion 28b, and a nut is fastened to the outer circumference of the stem portion 28b which penetrates the upper portion of the housing 26 in a state in which the body portion 28a is positioned in the sleeve 22, and as a result, the core 28 may be fixedly coupled to the upper portion of the housing 26.

A fluid entrance 28c, which serves to discharge inside air to the outside when air expands due to an increase in temperature of the solenoid unit 20, is formed in the core 28 and extends in a longitudinal direction of the core 28.

The valve opening and closing unit 30 is installed to isolate a portion between the solenoid unit 20 and the valve flow path unit 10 in an airtight manner, and opens and closes the discharge port 14 of the valve flow path unit 10 by being operated by power from the solenoid unit 20. The valve opening and closing unit 30 includes a plunger 32 which is disposed at a lower side of the core 28 and mounted to be movable vertically inside the sleeve 22 with a spring member 34 interposed therebetween, and a valve rod 36 is coupled to a lower end portion of the plunger 32 by means of an O-ring or the like.

A diaphragm 38 is installed at a lower end portion of the valve rod 36, and the diaphragm 38 is configured to isolate a portion between the sleeve 22 and the valve flow path unit 10 in an airtight manner, and serves to open and close the discharge port 14 of the valve flow path unit 10 while moving together with the valve rod 36.

The diaphragm 38 is manufactured in the form of a thin film by using a material such as rubber, plastic, or a metallic plate in order to maintain airtightness in the valve for a fuel cell and transmit pressure.

The pressure transmission unit 40 is disposed outside the valve flow path unit 10 and the solenoid unit 20 and serves to transmit pressure between the valve flow path unit 10 and the solenoid unit 20. The pressure transmission unit 40 includes a chamber diaphragm 42, and a first chamber unit 44 and a second chamber unit 46 which are isolated in an airtight manner by the chamber diaphragm 42.

The first chamber unit 44 is provided with a first hermetic pressure transmission chamber 45 which is in fluid communication with a branch flow path 16 that branches off from the discharge port 14 of the valve flow path unit 10, and the first chamber unit 44 is connected with the valve flow path unit 10 so as to transmit pressure.

The second chamber unit 46 is provided with a second hermetic pressure transmission chamber 47 which is in fluid communication with the fluid entrance 28c of the solenoid unit 20, and the second chamber unit 46 is connected with the solenoid unit 20 so as to transmit pressure.

The first pressure transmission chamber 45 provides a space in which fluid pressure may be transmitted to and from the valve flow path unit 10, and a first chamber opening 45a, which is in communication with the branch flow path 16, is disposed at a lower end of the first pressure transmission chamber 45. Since the first chamber opening 45a is disposed at the lower end of the first pressure transmission chamber 45, it is possible to prevent moisture from being collected in the first pressure transmission chamber 45a, and unavoidably collected moisture may be discharged through the discharge port 14 by gravity or gas pressure.

The second pressure transmission chamber 47 provides a space in which fluid pressure may be transmitted to and from the solenoid unit 20, and a second chamber opening 47a, which is in communication with the fluid entrance 28c of the solenoid unit 20, is disposed at an upper end of the second pressure transmission chamber 47.

The chamber diaphragm 42 is installed to isolate a portion between the first chamber unit 44 and the second chamber unit 46 in an airtight manner, and transmits pressure by being elastically deformed by a pressure difference between the first chamber unit 44 and the second chamber unit 46.

Figure 3:
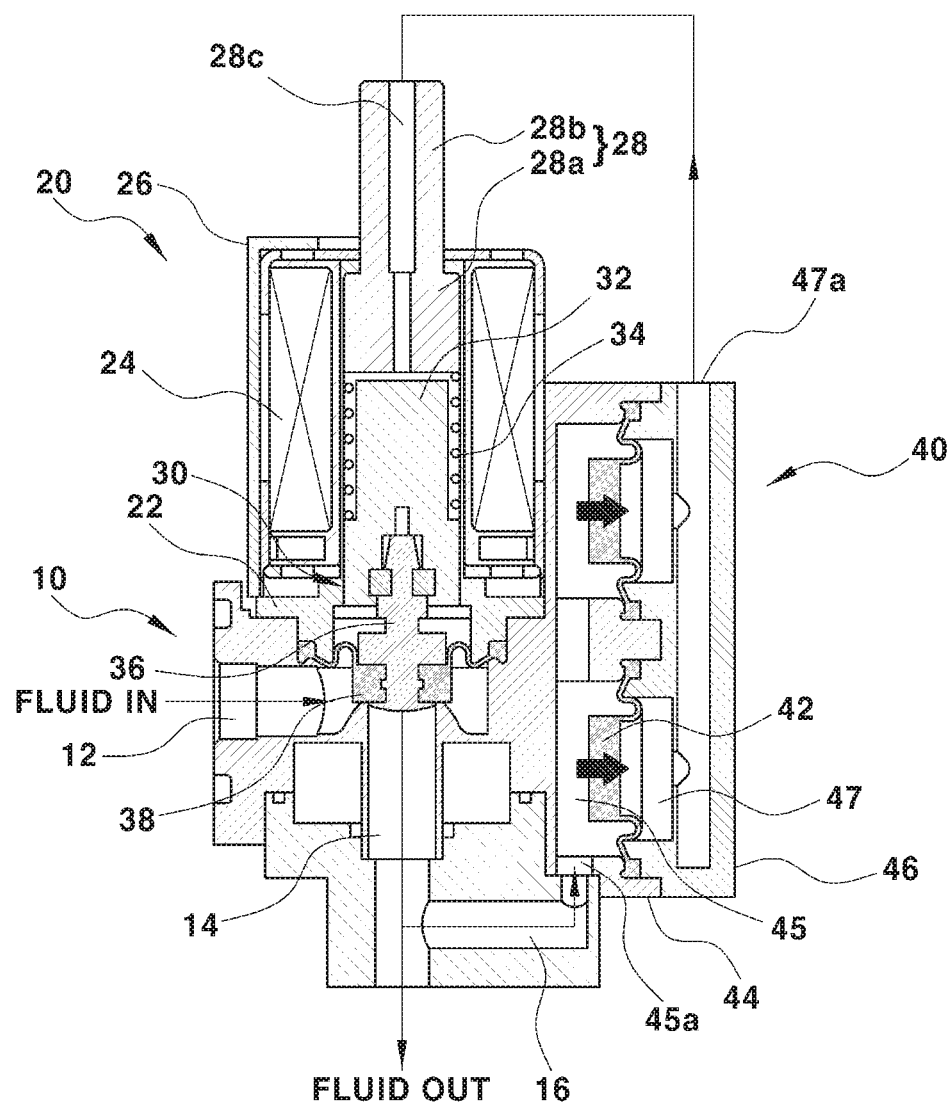

In particular, as illustrated in HG 2, when pressure in the first chamber unit 44 is lower than pressure in the second chamber unit 46, the chamber diaphragm 42 is deformed by being pushed to the first chamber unit 44, and as a result, the first pressure transmission chamber 45 is contracted, and the second pressure transmission chamber 47 is relatively expanded. Further, as illustrated in FIG. 3, when pressure in the first chamber unit 44 is higher than pressure in the second chamber unit 46, the chamber diaphragm 42 is deformed by being pushed to the second chamber unit 46, and as a result, the first pressure transmission chamber 45 is expanded, and the second pressure transmission chamber 47 is relatively contracted.

When a pressure difference occurs between the first pressure transmission chamber 45 and the second pressure transmission chamber 47 as described above, the chamber diaphragm 42 transmits pressure by being elastically deformed, and as a result, the first and second pressure transmission chambers 45 and 47 have the same or similar pressure.

In this case, the chamber diaphragm 42 may be made of a material that may block the fluid in the first pressure transmission chamber 45 from being transmitted while passing through the second pressure transmission chamber 47, thereby blocking moisture or gas in the valve flow path unit 10 from being transmitted to the solenoid unit 20.

For example, the chamber diaphragm 42 may be made of a material in the form of a thin film, such as rubber, plastic, or a metallic plate.

With the pressure transmission unit 40 configured as described above, the valve for a fuel cell according to the present invention may minimize a pressure difference between the valve flow path unit 10 and the solenoid unit 20, and as a result, the valve flow path unit 10 and the solenoid unit 20 always have nearly the same internal pressure.

In other words, in the case of the valve for a fuel cell according to the present invention, the first chamber unit 44 and the second chamber unit 46 of the pressure transmission unit 40 are in pressure equilibrium, such that a pressure difference between the valve flow path unit 10, which is in communication with the first chamber unit 44, and the solenoid unit 20, which is in communication with the second chamber unit 46, is minimized, regardless of factors such as working pressure and a temperature in the fuel cell system.

Specifically, pressure of the valve flow path unit 10 is higher than pressure in the solenoid unit 20 when the fuel cell system is initially operated under a pressurized condition, but pressure is transmitted as the chamber diaphragm 42 is deformed by being pushed to the second chamber unit 46, and as a result, pressure in the valve flow path unit 10 is relatively decreased, and pressure in the solenoid unit 20 is relatively increased, such that a pressure difference is reduced.

When a temperature of the solenoid unit 20 is increased, air expands due to the change in temperature, such that pressure in the solenoid unit 20 becomes higher than pressure in the valve flow path unit 10. In this case, pressure is transmitted as the chamber diaphragm 42 is deformed by being pushed to the first chamber unit 44, and as a result, pressure in the valve flow path unit 10 is relatively increased, and pressure in the solenoid unit 20 is relatively decreased, such that a pressure difference is reduced.

Since the pressure transmission unit 40 is configured between the solenoid unit 20 and the valve flow path unit 10 as described above, it is possible to minimize a pressure difference between the solenoid unit 20 and the valve flow path unit 10 which is caused by a factor such as working pressure and a temperature in the fuel cell system, and as a result, it is possible to minimize a load of the spring member 34 to maintain a closed state of the valve opening and closing unit 30 (in the case of a normal close valve) or an opened state of the valve opening and closing unit 30 (in the case of a normal open valve). As a result, magnetic force required to operate the valve opening and closing unit 30 is minimized, such that it is possible to minimize a volume of the solenoid unit 20 and electric power consumption. In addition, a load applied to the valve opening and closing unit 30 is relatively reduced, such that a service life thereof may be increased, and a range of working pressure of the valve for a fuel cell may be increased.

The valve for a fuel cell may be adopted as a gas discharge valve for discharging gas that circulates in the stack, or a water discharge valve for discharging water (condensate water) discharged from the stack to the outside or supplying the water to other locations of the fuel cell system.

Figure 4:
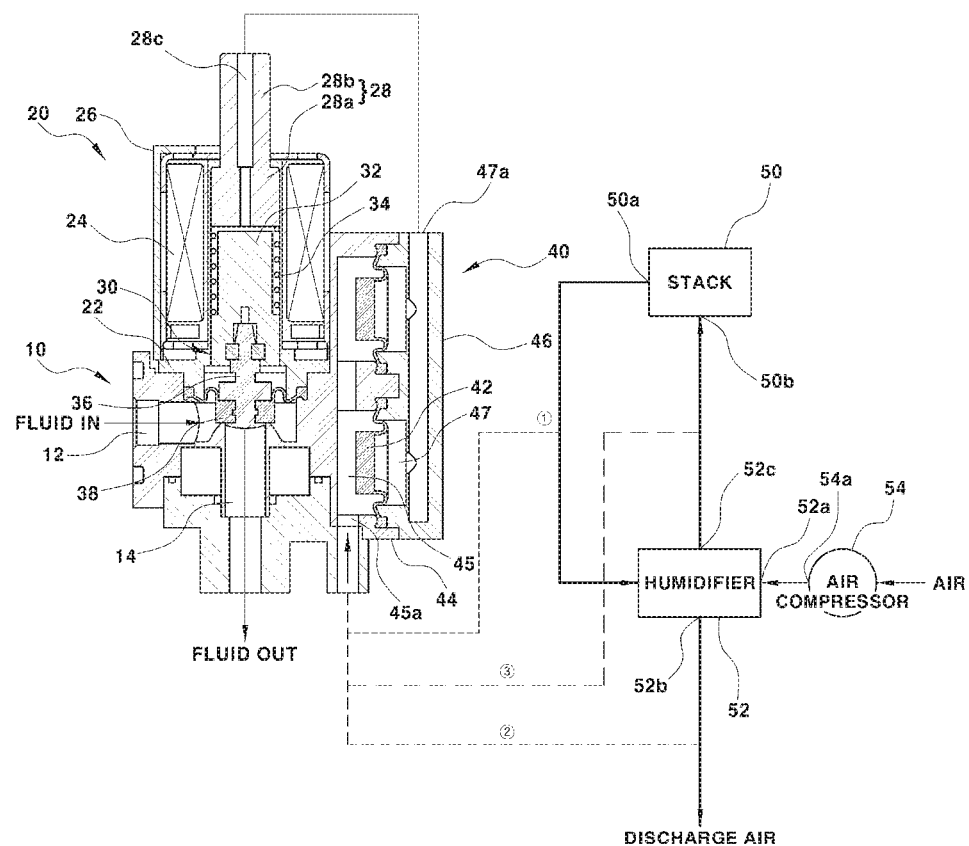
FIGS. 4 and 5 are configuration diagrams illustrating a valve for a fuel cell according to another exemplary embodiment of the present invention.
Figure 5:
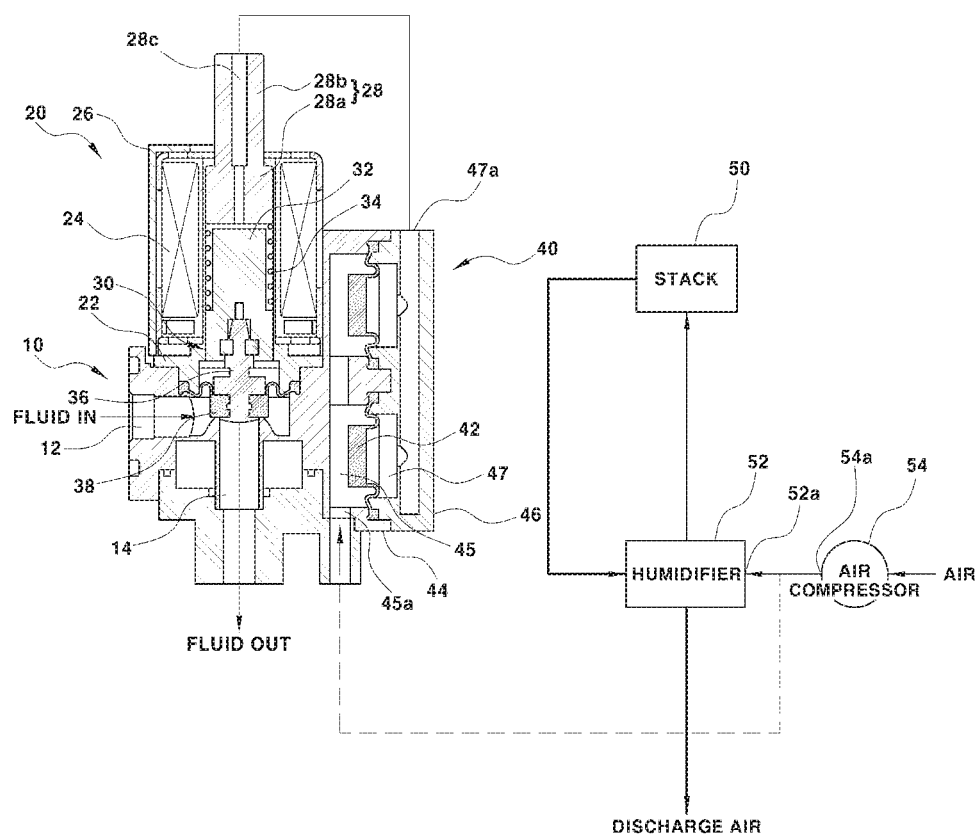

FIGS. 4 and 5 are views illustrating a valve for a fuel cell according to another exemplary embodiment of the present invention.

The valve for a fuel cell illustrated in FIGS. 4 and 5 has the same structure as the valve for a fuel cell according to the aforementioned exemplary embodiment except that the branch flow path 16, which branches off from the discharge port 14, is omitted, and instead, the first chamber opening 45a is in communication with an air flow passage of the fuel cell system.

Referring to FIG. 4, pressure of air, which is discharged from a fuel cell stack 50 and supplied to an air humidifier 52, that is, air pressure after the air is discharged from the fuel cell stack 50 and before the air flows into the air humidifier 52 may be used as reference pressure for the first chamber unit 44, pressure of air which is discharged from the air humidifier 52 to the outside, that is, pressure of air which is supplied by an air compressor 54 and then discharged to the outside while passing through the air humidifier 52 may be used as the reference pressure for the first chamber unit 44, or pressure of air which is supplied from the air humidifier 52 to the stack 50, that is, air pressure after the air is humidified by passing through the air humidifier 52 and before the air flows into the stack 50 may be used as the reference pressure for the first chamber unit 44.

To this end, the first chamber opening 45a is connected to be in fluid communication with an air flow passage between a rear end (an air discharge port) 50a of the stack 50 and a front end (an inlet side) 52a of the air humidifier 52, an air flow passage at a rear end (an outlet side for discharging air to the outside) 52b of the air humidifier 52 which is connected to the outside, or an air flow passage between a rear end (an outlet side for discharging air to the stack) 52c of the air humidifier 52 and a front end (an air port) 50b of the stack 50. In this case, the inlet port 12 of the valve flow path unit 10 is connected to same air flow passage that provides the reference pressure to the first chamber opening 45a.

In particular, pressure identical to the reference pressure for the first chamber unit 44 is supplied to the inlet port 12 of the valve flow path unit 10. That is, air pressure after the air is discharged from the fuel cell stack 50 and before the air flows into the air humidifier 52, pressure of air which is discharged to the outside while passing through the air humidifier 52, or air pressure after the air passes through the air humidifier 52 and before the air flows into the stack 50 may be used as the pressure to be supplied to the inlet port 12.

The air, which is discharged from the stack 50 and supplied to the air humidifier 52, and the air, which is discharged to the outside while passing through the air humidifier 52, are dry, and the air, which passes through the air humidifier 52 and is supplied to the stack 50, is wet air.

Referring to FIG. 5, pressure of air, which is supplied to the air humidifier 52 by the air compressor 54, that is, air pressure after the air is discharged from the air compressor 54 and before the air flows into the air humidifier 52 may be used as the reference pressure for the first chamber unit 44.

To this end, the first chamber opening 45a is connected to be in fluid communication with an air flow passage between the rear end 54a of the air compressor 54 and the front end 52a of the air humidifier 52, and in this case, the inlet port 12 of the valve flow path unit 10 is connected with the same air flow passage that provides the reference pressure to the first chamber opening 45a.

In other words, pressure identical to the reference pressure for the first chamber unit 44 is supplied to the inlet port 12 of the valve flow path unit 10, and specifically, air pressure after the air is supplied by the air compressor 54 and before the air flows into the air humidifier 52 may be used as the pressure to be supplied to the inlet port 12.

As described above, since the air flow passage for allowing air to flow in the fuel cell system is in communication with the first chamber opening 45a, and pressure of air, which is supplied through the air flow passage, is used as the reference pressure for the first chamber unit 44, the following effects can be expected.

1. In a case in which the first chamber opening 45a is connected to be in fluid communication with the air flow passage between the rear end (the air discharge port) 50a of the stack and the front end (the inlet side) 52a of the air humidifier, the air flow passage at rear end (the outlet side for discharging air to the outside) 52b of the air humidifier which is connected to the outside, or the air flow passage between the rear end (the outlet side for discharging air to the stack) 52c of the air humidifier and the front end (an air inlet port) 50b of the stack as illustrated in FIG. 4, when the fuel cell system is operated under a pressurized condition, the chamber diaphragm 42 is deformed by being pushed to the second chamber unit 46 by the reference pressure in communication with the first chamber unit 44, such that pressure in the solenoid unit 20 is relatively increased, and a pressure difference from initial pressure in the valve flow path unit 10 may be reduced, and when pressure in the solenoid unit 20 becomes higher than pressure in the valve flow path unit 10, the chamber diaphragm 42 is deformed by being pushed to the first chamber unit 44, such that pressure in the solenoid unit 20 is relatively decreased, and a difference from pressure in the valve flow path unit 10 may be reduced.

2. In a case in which the first chamber opening 45a is connected to be in fluid communication with the air flow passage between the rear end (outlet side) 54a of the air compressor and the front end (inlet side) 52a of the air humidifier as illustrated in FIG. 5, the first chamber opening 45a is in communication with the air flow passage of the fuel cell system, which has the highest air pressure among the air flow passages, and as a result, it is possible to minimize the amount of pressure to be transmitted by the chamber diaphragm 42.

In a case in which the first chamber opening 45a is connected to be in fluid communication with a hydrogen flow passage for allowing hydrogen to flow in the fuel cell system, the pressure transmission unit 40 may be included in a fuel supply device, such that it is possible to prevent an increase in volume of the valve for a fuel cell which may be caused when the pressure transmission unit 40 is added, and to minimize the leakage of hydrogen to the outside of the valve because the discharge port 14 of the valve flow path unit 10 is more tightly closed when excessive pressure is applied to the hydrogen flow passage.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A valve for a fuel cell, comprising:
   a valve flow path unit which has an inlet port for an inflow of a fluid, and a discharge port for discharging the fluid;
   a solenoid unit which is installed on an upper portion of the valve flow path unit and generates power for opening and closing the discharge port;
   a valve opening and closing unit which is installed to isolate a portion between the solenoid unit and the valve flow path unit in an airtight manner, and opens and closes the discharge port by using power from the solenoid unit; and
   a pressure transmission unit which is disposed outside the valve flow path unit and the solenoid unit, and transmits pressure between the discharge port of the valve flow path unit and a fluid entrance for discharging air in the solenoid unit,
   wherein the pressure transmission unit includes a first chamber unit which is connected to be in fluid communication with the discharge port of the valve flow path unit, a second chamber unit which is connected to be in fluid communication with the fluid entrance of the solenoid unit, and a chamber diaphragm which is installed to isolate a portion between the first chamber unit and the second chamber unit in an airtight manner, wherein the chamber diaphragm transmits pressure between the discharge port of the valve flow path unit and the fluid entrance of the solenoid unit by being elastically deformed by a pressure difference between the first chamber unit and the second chamber unit.

2. The valve of claim 1, wherein a first hermetic pressure transmission chamber, which is connected to be in fluid communication with a branch flow path that branches off from the discharge port of the valve flow path unit, is formed in the first chamber unit.

3. The valve of claim 2, wherein a first chamber opening, which is in communication with the branch flow path, is disposed at a lower end of the first pressure transmission chamber.

4. The valve of claim 1, wherein a second hermetic pressure transmission chamber, which is connected to be in fluid communication with a fluid entrance for discharging air in the solenoid unit, is formed in the second chamber unit.

5. The valve of claim 1, wherein the chamber diaphragm is made of a material that blocks the fluid from being transmitted to the second chamber unit while passing through the first chamber unit.

6. A valve for a fuel cell, comprising:
   a valve flow path unit which has an inlet port for an inflow of a fluid, and a discharge port for discharging the fluid;
   a solenoid unit which is installed on an upper portion of the valve flow path unit and generates power for opening and closing the discharge port;
   a valve opening and closing unit which is installed to isolate a portion between the solenoid unit and the valve flow path unit in an airtight manner, and opens and closes the discharge port by using power from the solenoid unit; and
   a pressure transmission unit which transmits pressure between a fluid entrance for discharging air in the solenoid unit and an air flow passage through which air discharged from a stack and supplied to an air humidifier flows,
   wherein the pressure transmission unit includes a first chamber unit which is connected to be in fluid communication with the air flow passage, a second chamber unit which is connected to be in fluid communication with the fluid entrance of the solenoid unit, and a chamber diaphragm which is installed to isolate a portion between the first chamber unit and the second chamber unit in an airtight manner, wherein the chamber diaphragm transmits pressure between the air flow passage and the fluid entrance of the solenoid unit by being elastically deformed by a pressure difference between the first chamber unit and the second chamber unit, and
   wherein a first hermetic pressure transmission chamber, which is provided with a first chamber opening for fluid communication, is formed in the first chamber unit, and the first chamber opening is connected to be in fluid communication with the air flow passage.

7. A valve for a fuel cell, comprising:
   a valve flow path unit which has an inlet port for an inflow of a fluid, and a discharge port for discharging the fluid;
   a solenoid unit which is installed on an upper portion of the valve flow path unit and generates power for opening and closing the discharge port;
   a valve opening and closing unit which is installed to isolate a portion between the solenoid unit and the valve flow path unit in an airtight manner, and opens and closes the discharge port by using power from the solenoid unit; and
   a pressure transmission unit which transmits pressure between a fluid entrance for discharging air in the solenoid unit and an air flow passage through which air discharged from a stack and supplied to an air humidifier flows,
   wherein the pressure transmission unit includes a first chamber unit which is connected to be in fluid communication with the air flow passage, a second chamber unit which is connected to be in fluid communication with the fluid entrance of the solenoid unit, and a chamber diaphragm which is installed to isolate a portion between the first chamber unit and the second chamber unit in an airtight manner, wherein the chamber diaphragm transmits pressure between the air flow passage and the fluid entrance of the solenoid unit by being elastically deformed by a pressure difference between the first chamber unit and the second chamber unit, and
   wherein a first hermetic pressure transmission chamber, which is provided with a first chamber opening for fluid communication, is formed in the first chamber unit, and the first chamber opening is connected to be in fluid communication with the air flow passage.

8. A valve for a fuel cell, comprising:
   a valve flow path unit which has an inlet port for an inflow of a fluid, and a discharge port for discharging the fluid;
   a solenoid unit which is installed on an upper portion of the valve flow path unit and generates power for opening and closing the discharge port;
   a valve opening and closing unit which is installed to isolate a portion between the solenoid unit and the valve flow path unit in an airtight manner, and opens and closes the discharge port by using power from the solenoid unit; and a pressure transmission unit which transmits pressure between a fluid entrance for discharging air in the solenoid unit and an air flow passage through which air discharged from a stack and supplied to an air humidifier flows, wherein the pressure transmission unit includes a first chamber unit which is connected to be in fluid communication with the air flow passage, a second chamber unit which is connected to be in fluid communication with the fluid entrance of the solenoid unit, and a chamber diaphragm which is installed to isolate a portion between the first chamber unit and the second chamber unit in an airtight manner, wherein the chamber diaphragm transmits pressure between the air flow passage and the fluid entrance of the solenoid unit by being elastically deformed by a pressure difference between the first chamber unit and the second chamber unit, and wherein a first hermetic pressure transmission chamber, which is provided with a first chamber opening for fluid communication, is formed in the first chamber unit, and the first chamber opening is connected to be in fluid communication with the air flow passage.

9. A valve for a fuel cell, comprising:

a valve flow path unit which has an inlet port for an inflow of a fluid, and a discharge port for discharging the fluid;

a solenoid unit which is installed on an upper portion of the valve flow path unit and generates power for opening and closing the discharge port;

a valve opening and closing unit which is installed to isolate a portion between the solenoid unit and the valve flow path unit in an airtight manner, and opens and closes the discharge port by using power from the solenoid unit; and a pressure transmission unit which transmits pressure between a fluid entrance for discharging air in the solenoid unit and an air flow passage through which air discharged from a stack and supplied to an air humidifier flows, wherein the pressure transmission unit includes a first chamber unit which is connected to be in fluid communication with the air flow passage, a second chamber unit which is connected to be in fluid communication with the fluid entrance of the solenoid unit, and a chamber diaphragm which is installed to isolate a portion between the first chamber unit and the second chamber unit in an airtight manner, wherein the chamber diaphragm transmits pressure between the air flow passage and the fluid entrance of the solenoid unit by being elastically deformed by a pressure difference between the first chamber unit and the second chamber unit, and wherein a first hermetic pressure transmission chamber, which is provided with a first chamber opening for fluid communication, is formed in the first chamber unit, and the first chamber opening is connected to be in fluid communication with the air flow passage.

* * * * *